United States Patent
Shyu et al.

(10) Patent No.: US 7,460,314 B2
(45) Date of Patent: Dec. 2, 2008

(54) THREE-PIECE TYPE OPTICAL LENS

(75) Inventors: San-Woei Shyu, Taipei (TW); Chi-Hsiung Wang, Taipei (TW)

(73) Assignee: E-Pin Optical Industry Co., Ltd, Taipei (TW)

( * ) Notice: Subject to any disclaimer, the term of this patent is extended or adjusted under 35 U.S.C. 154(b) by 16 days.

(21) Appl. No.: 11/711,872

(22) Filed: Feb. 28, 2007

(65) Prior Publication Data
US 2008/0204896 A1    Aug. 28, 2008

(51) Int. Cl.
*G02B 9/12* (2006.01)
(52) U.S. Cl. ..................... 359/784; 359/708
(58) Field of Classification Search ............. 359/708, 359/716, 784
See application file for complete search history.

(56) References Cited
U.S. PATENT DOCUMENTS
7,199,948 B1 * 4/2007 Sato ........................... 359/785

2006/0061882 A1 * 3/2006 Sun ........................... 359/784
2007/0070526 A1 * 3/2007 Sato .......................... 359/784
2007/0091468 A1 * 4/2007 Kubota et al. ............... 359/784

* cited by examiner

*Primary Examiner*—Darryl J Collins
(74) *Attorney, Agent, or Firm*—Troxell Law Office, PLLC

(57) ABSTRACT

A three piece type optical lens includes a first lens element with positive refractive power, a second lens element with negative refractive power, a third lens element with negative refractive power, an IR cut-off filter and an image sensor arranged along an optical axis in sequence from an object side. The first lens element and the second lens element are both meniscus aspherical lens while a convex surface of the first lens element is on the object side and a convex surface of the second lens is on the image side. The third lens element is an M-shaped aspherical lens whose object side and image side are both M-shaped and a central surface of the optical axis can be a convex surface or a concave surface. A pre-aperture is disposed or a center-aperture is arranged on the optical lens.

11 Claims, 16 Drawing Sheets

THREE-PIECE TYPE OPTICAL LENS

BACKGROUND OF THE INVENTION

The present invention relates to a three-piece type optical lens, and more particularly to an optical lens for mobile phones or image sensors such as CCD (Charge Coupled Device) or CMOS (Complementary Metal. Oxide Semiconductor) formed by three pieces of lens with features of high performance, minimized total length and low cost.

Due to fast development of modern technology, electronics have become compact with more functions. A lot of electronics such as digital still cameras, PC (personal computer) cameras, network cameras, mobile phones, even personal digital assistants are equipped with image capturing devices (lens). For convenience of easy-carrying and requirement of humanization, the image capturing devices requires good image quality, compact volume and low cost. Especially for applications on mobile phones, the above requirements are getting more important.

Owing to various materials available for making the lens and better correcting effect for color aberration, conventional spherical ground glass lenses have been widely adopted in optical industry field. However, the spherical ground glass lenses have poor effect on correction of spherical aberration and astigmatic aberration when being applied under condition of a smaller F number and wide angle of field. To improve above shortcomings of the conventional spherical ground glass lenses, the image capturing devices available now use aspherical plastic lenses or aspherical molded glass lenses to replace conventional spherical ground glass lenses for better imaging quality. For example, refer to the lenses disclosed in U.S. Pat. No. 6,795,253, U.S. Pat. No. 6,961,191 U.S. Pat. No. 6,441,971, Pub. No. US 2004/0061953 A1, Pub. No. US 2004/0190158 A1, Pub. No. US 2004/0190162 A1, Pub. No. US 2004/0231823 A1, Pub. No. US 2005/0231822 A1, or Japanese patent No. 3567327, No. 3717488, No. 3768509, No. 3816095, Pub. No. 2005-084404, Pub. No. 2006-047858, Pub. No. 2005-309210, Pub. No. 2005-227755, Pub. No. 2005-345919, Pub. No. 2005-292235, Pub. No. 2004-004566, Pub. No. 2005-338234 are all composed of three lens components/lens elements—a first lens element, a second lens element and a third lens element arranged in order from the object side. Basic design of above patents are composed of a first, a second and a third lens set/lens element in order from the object side. The differences among embodiments of above patents are in components or combinations of components. Or the design of the first, the second and the third lens sets/lens elements are in different shapes. For example, the three lens sets/lens elements are all in meniscus shape or the first and the second lens sets/lens elements are meniscus while the third lens set/lens element is in plano-concave shape or plano-convex shape. Or the convex surface/concave surface of the first/second/third lens sets/lens elements can be arranged on the object/image side. Or the refractive power of the three lens sets/lens elements may vary. For example, refractive power of the first the second and the third lens sets/lens elements are respectively positive, negative, positive or positive positive, negative in sequence. The three lens set/lens element respectively satisfy various optical parameters such as f (effective focal length of the whole optical lens), d (distance between the object side of the first lens element and the image side of the third lens element), R1 (radius of curvature of the object side of the first lens element), R2 (radius of curvature of the image side of the first lens element), Fno (F number of the optical lens), br (back focal length of the whole optical lens), f1 (effective focal length of the first lens element), and f3 (effective focal length of the third lens element). For example, refer to Japanese patent No. 3717488, the conditions of: $0.8<f1/f<2.0$, $0.5<(|R2|-R1)/(R1+|R2|)$, and $1.5<f3/f<3.0$ are satisfied.

Thus it is learned the design of a three-piece type optical lens is not so difficult in this field. However, total lens of the above optical lens is still too long so that the optical lens can't have smaller volume with lower cost. Moreover, correction effect of aberration of the lens as well as light angle is not ideal. Thus general requirement of electronic products such as compact and good performance can't be achieved. Therefore, applications of the optical lens are limited, especially unable to be applied to mobile phones.

SUMMARY OF THE INVENTION

It is therefore a primary object of the present invention to provide a three piece type optical lens that includes a first lens element with positive refractive power, a second lens element with negative refractive power, a third lens element with negative refractive power, an IR cut-off filter and an image sensor arranged along an optical axis in sequence from an object side. The first lens element and the second lens element are both meniscus aspherical lens while a convex surface of the first lens element is on the object side and a convex surface of the second lens is on the image side. The third lens element is a M-shaped aspherical lens whose object side and image side are both M-shaped and a central surface of the optical axis can be a convex surface or a concave surface. Moreover, the three piece type optical lens satisfies following conditions: $0.4f \leq d < 0.9f$, $0.3 < |R1/R2| < 0.6$, $2.8 \leq Fno < 3.6$, $0.2 < br/f < 0.4$, $0.5 < f1/f < 1$, and $-10.0 < f3/f < -2.0$, wherein f is an effective focal length of the whole lens; d is the distance between an object side of the first lens element and an image side of the third lens element; R1 is a radius of curvature of the object side of the first lens element, R2 is a radius of curvature of the image side of the first lens element, Fno is F number of the optical lens, br is a back focal length of the whole optical lens of the present invention, f1 is an effective focal length of the first lens element, and f3 is an effective focal length of the third lens element. By effectively correcting spherical aberration and reducing light angle, the optical lens has high resolution and minimized total length. Thus applications of the lens are more widely.

It is another object of the present invention to provide a three piece type optical lens in which a pre-aperture is disposed on the optical lens while an aperture stop is arranged on or in front of the convex surface of the object side of the first lens element so as to effectively minimize total length of the lens for extending applications of the lens. Or the optical lens is disposed with a center-aperture while an aperture stop is arranged on an image side of the first lens element, on an object side of the second lens element or between the image side of the first lens element and the object side of the second lens element also for effectively minimizing total length of the lens.

DETAILED DESCRIPTION OF THE PREFERRED EMBODIMENT

Figure 1:
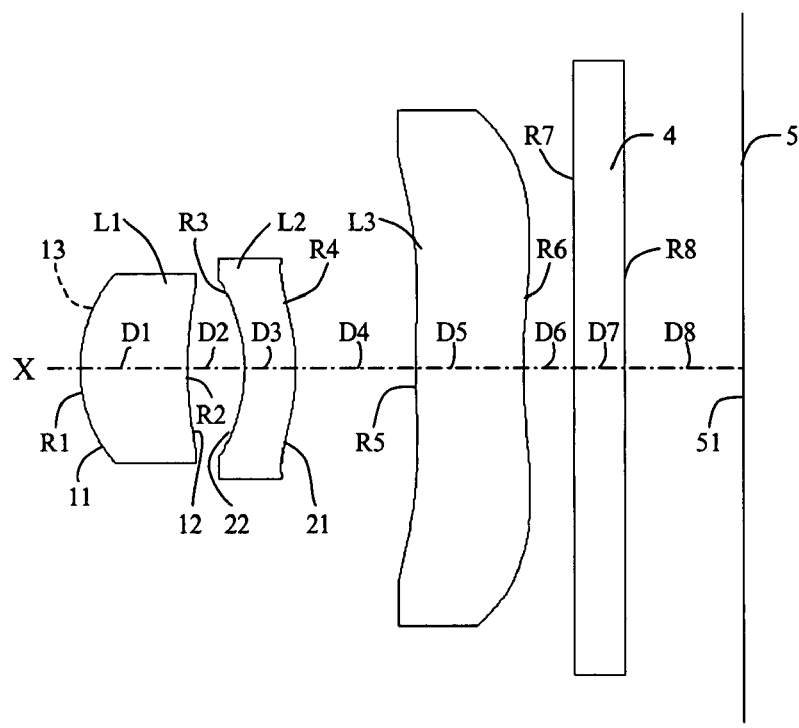
FIG. 1 is a schematic drawing of an optical structure of an embodiment according to the present invention.
Figure 2:
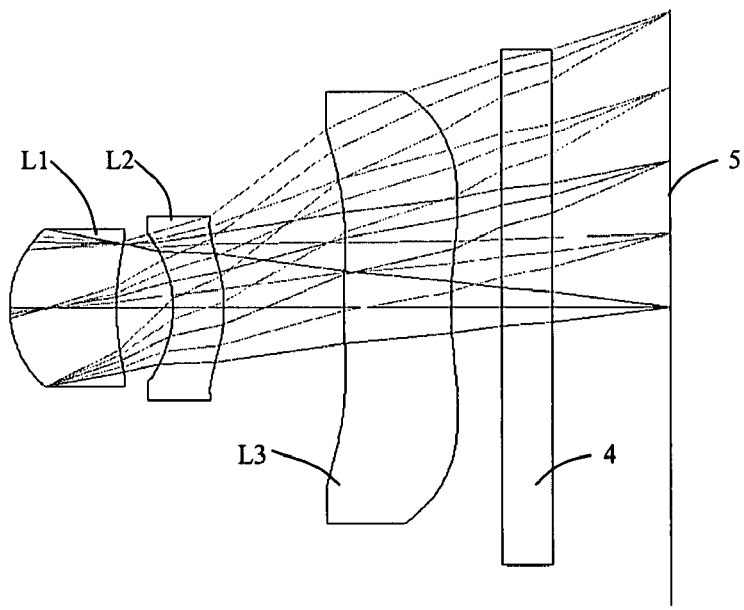
FIG. 2 is a schematic drawing of a light path of an embodiment according to the present invention.
Figure 3:
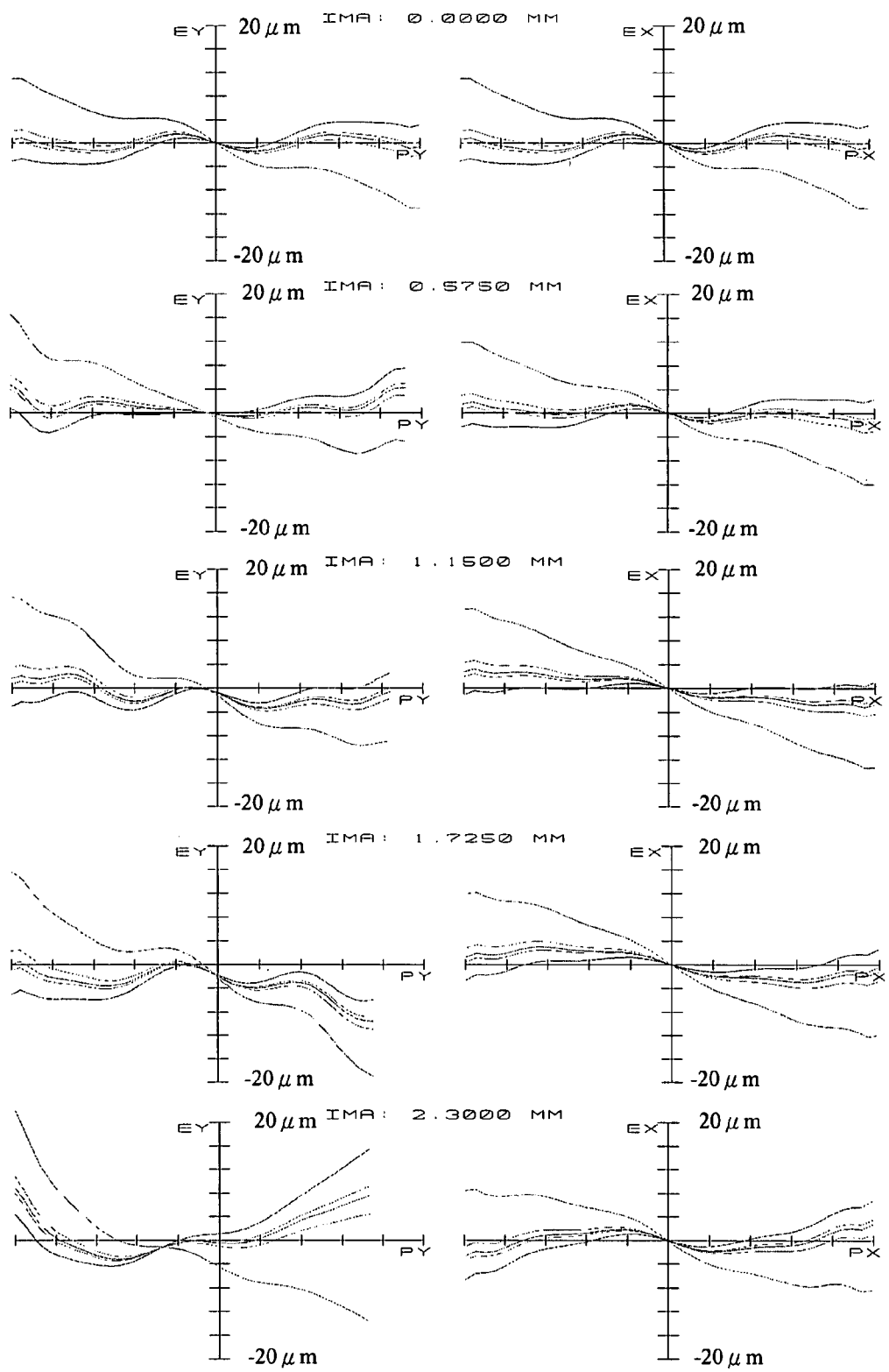
FIG. 3 is a transverse ray fan plot in different field (true image size 0, 0.575, 1.15, 1.725, 2.3 mm) of an embodiment according to the present invention.
Figure 4:
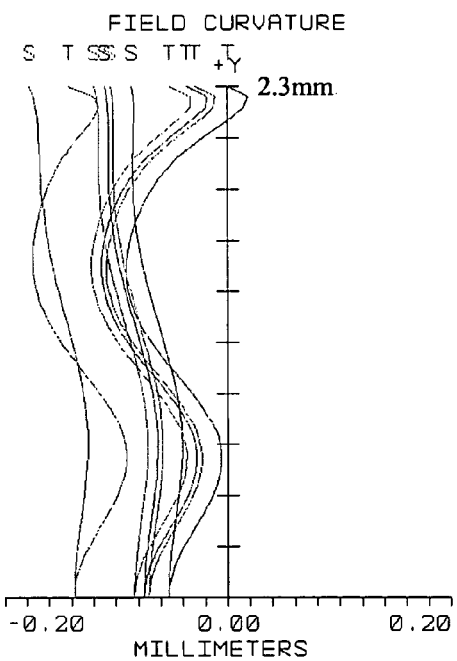
FIG. 4 shows field curvature of an image of an embodiment according to the present invention.
Figure 5:
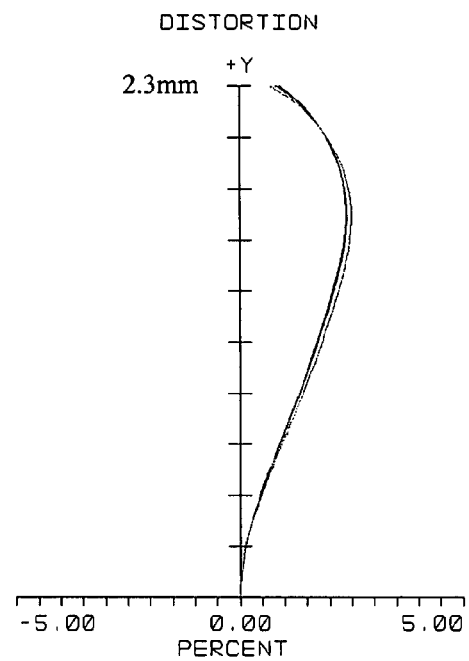
FIG. 5 shows distortion of an image of an embodiment according to the present invention.
Figure 6:
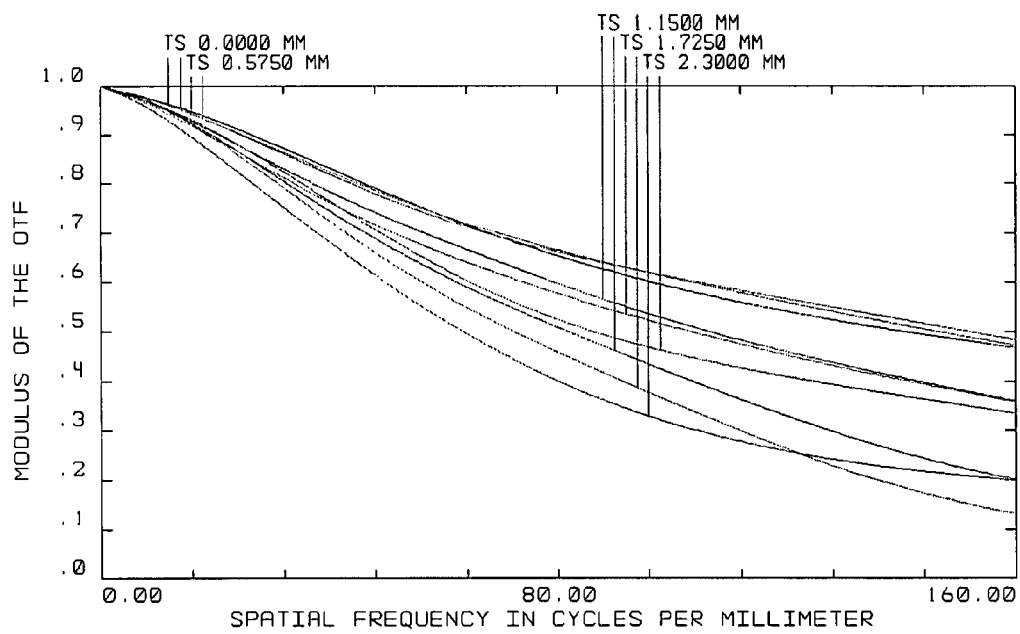
FIG. 6 shows modulation transfer function of an embodiment in five different field(true image size 0, 0.575, 1.15, 1.725, 2.3 mm) corresponding to spatial frequency ranging from 0 to 120 LP/mm.
Figure 7:
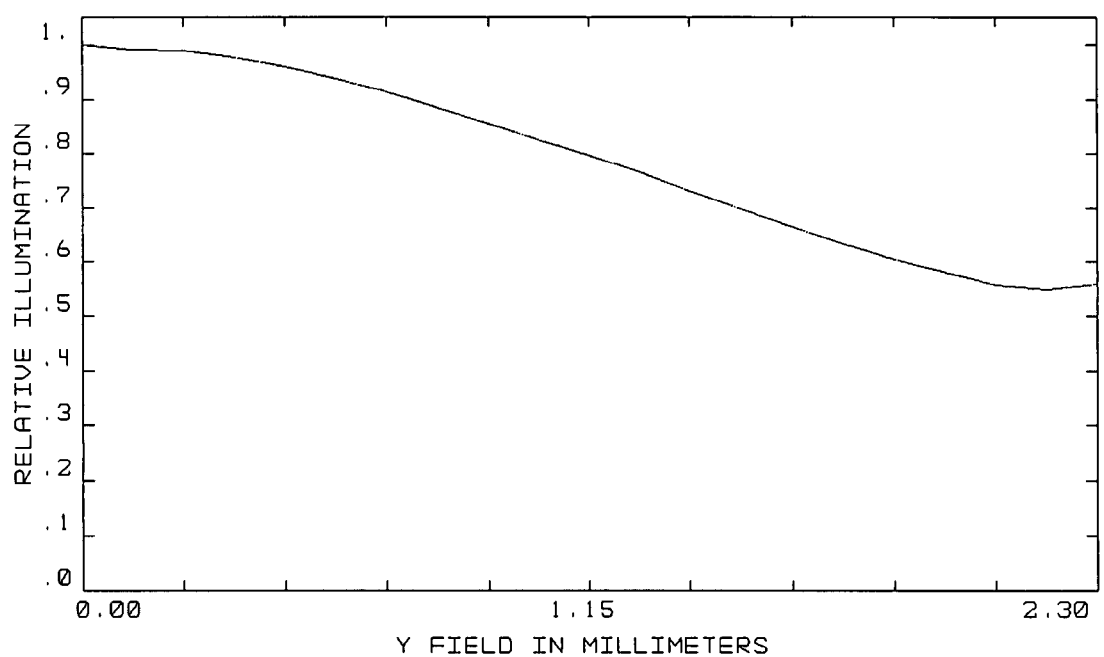
FIG. 7 is a graph showing relative illumination generating by full field toward zero field of an embodiment according to the present invention.
Figure 8:
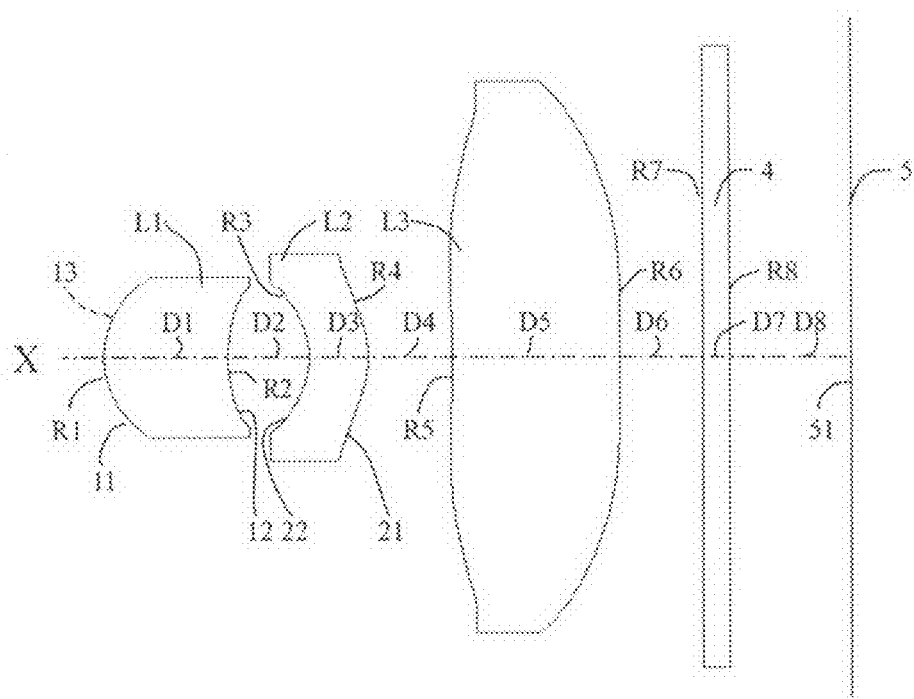
FIG. 8 is a schematic drawing of an optical structure of another embodiment according to the present invention.
Figure 9:
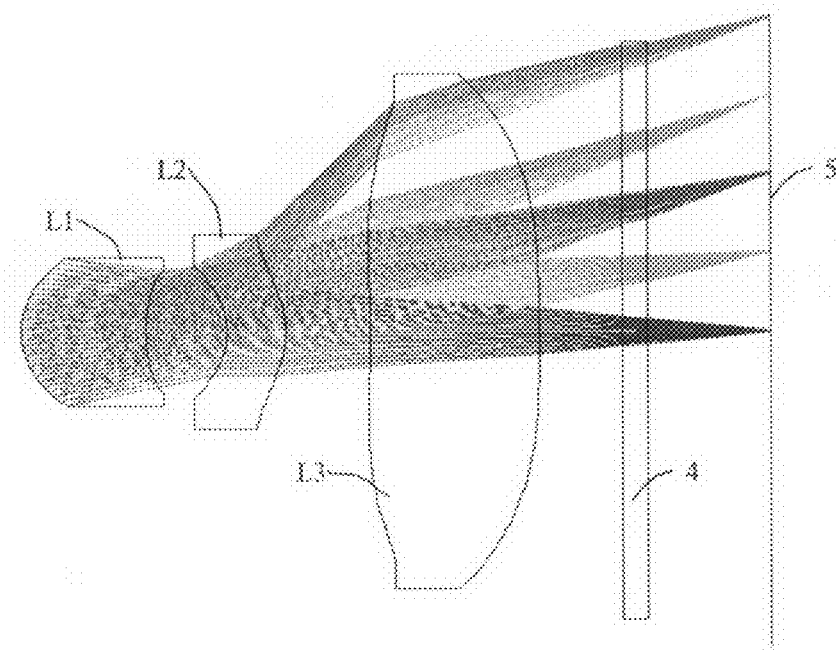
FIG. 9 is a schematic drawing of a light path of another embodiment according to the present invention.
Figure 10:
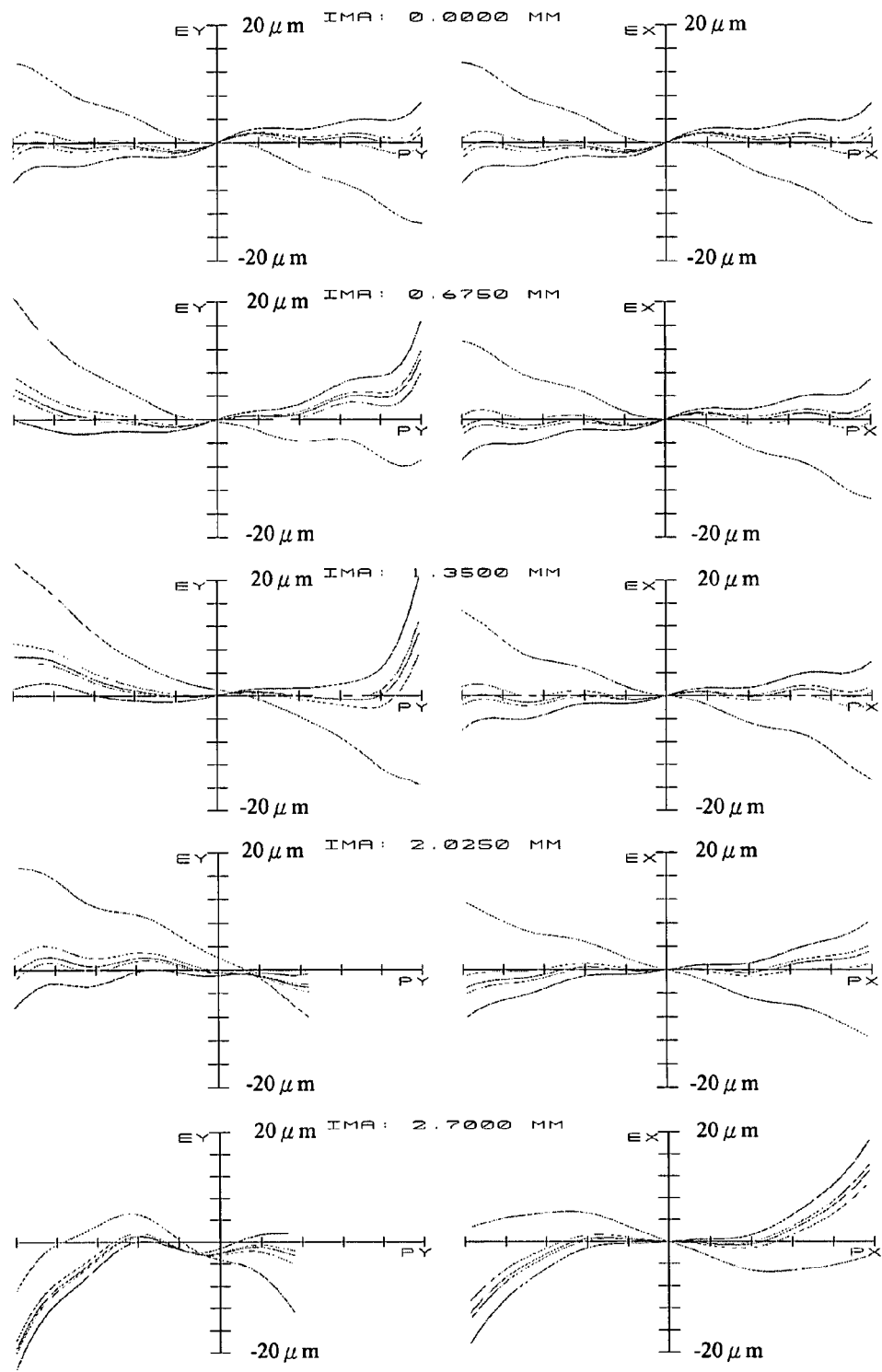
FIG. 10 is a transverse ray fan plot in different field (true image size 0, 0.675, 1.35, 2.025, 2.7 mm) of an embodiment according to the present invention.
Figure 11:
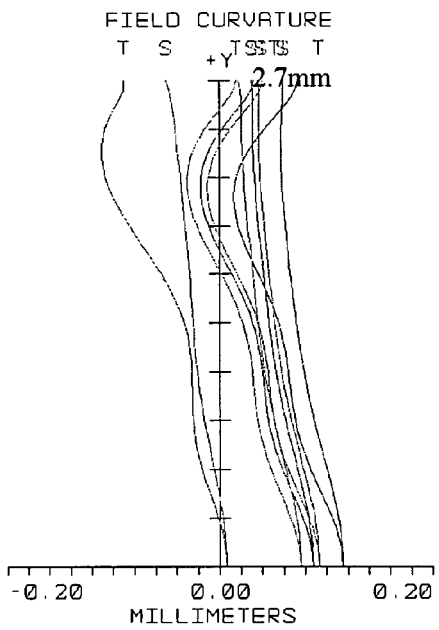
FIG. 11 shows field curvature of an image of an embodiment according to the present invention.
Figure 12:
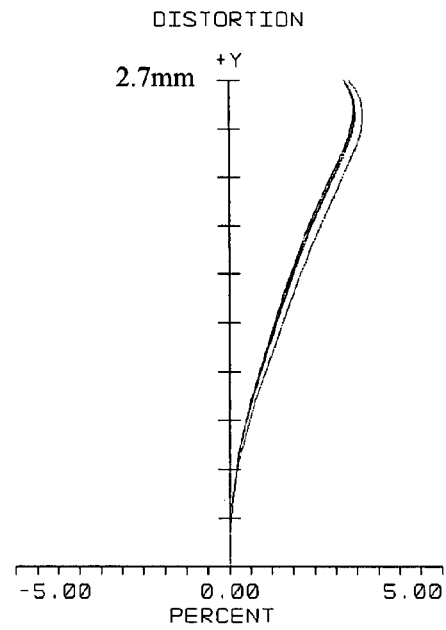
FIG. 12 shows distortion of an image of an embodiment according to the present invention.
Figure 13:
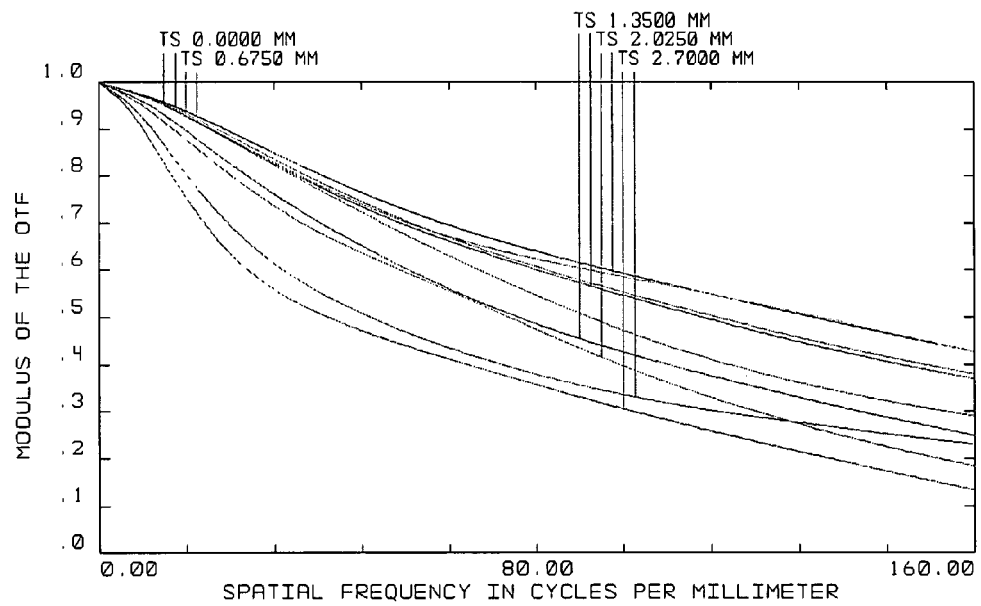
FIG. 13 shows modulation transfer function of an embodiment in five different field(true image size 0, 0.675, 1.35, 2.025, 2.7 mm) corresponding to spatial frequency ranging from 0 to 120 LP/mm.
Figure 14:
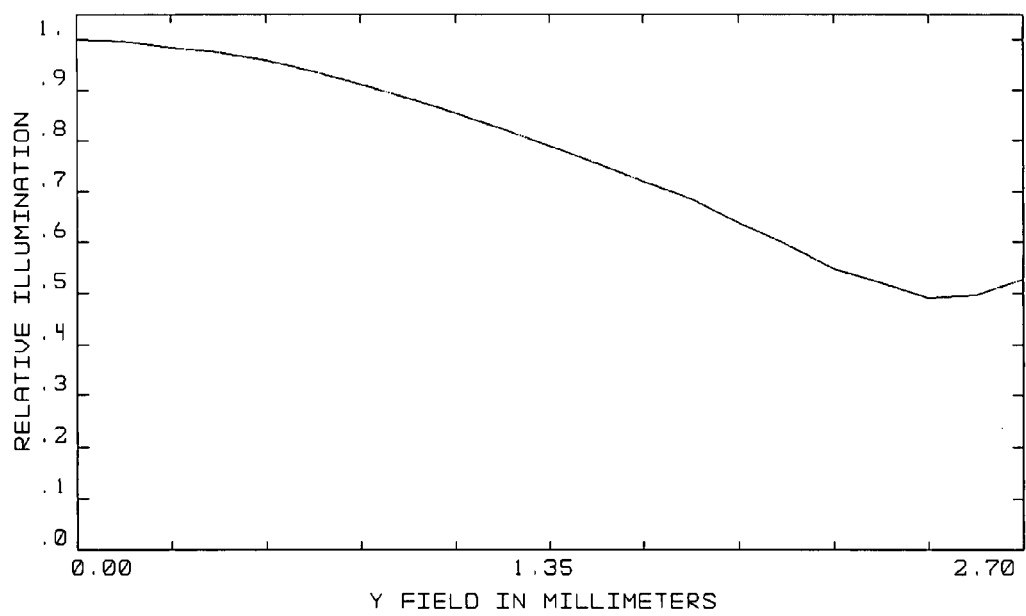
FIG. 14 is a graph showing relative illumination generating by full field toward zero field of another embodiment according to the present invention.
Figure 15:
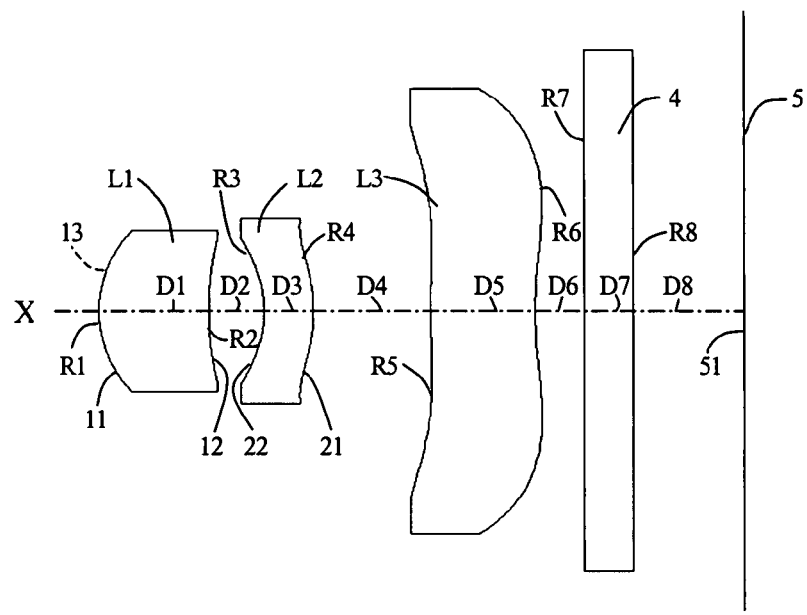
FIG. 15 is a schematic drawing of an optical structure of a further embodiment according to the present invention.
Figure 16:
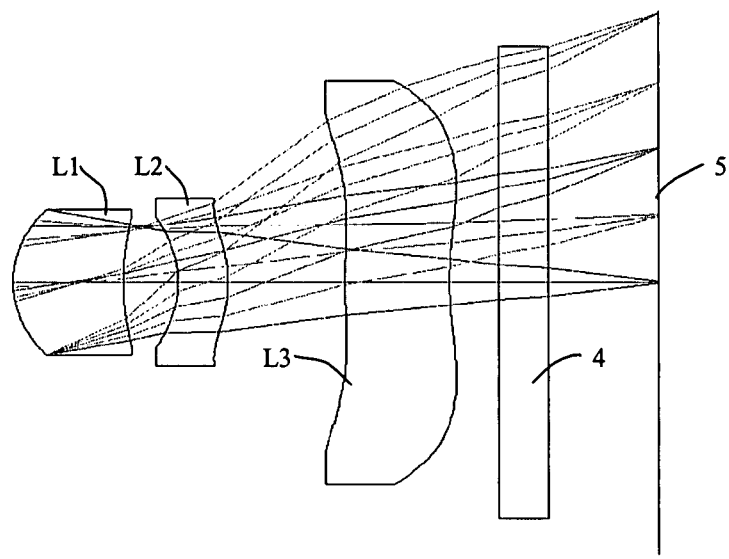
FIG. 16 is a schematic drawing of a light path of a further embodiment according to the present invention.
Figure 17:
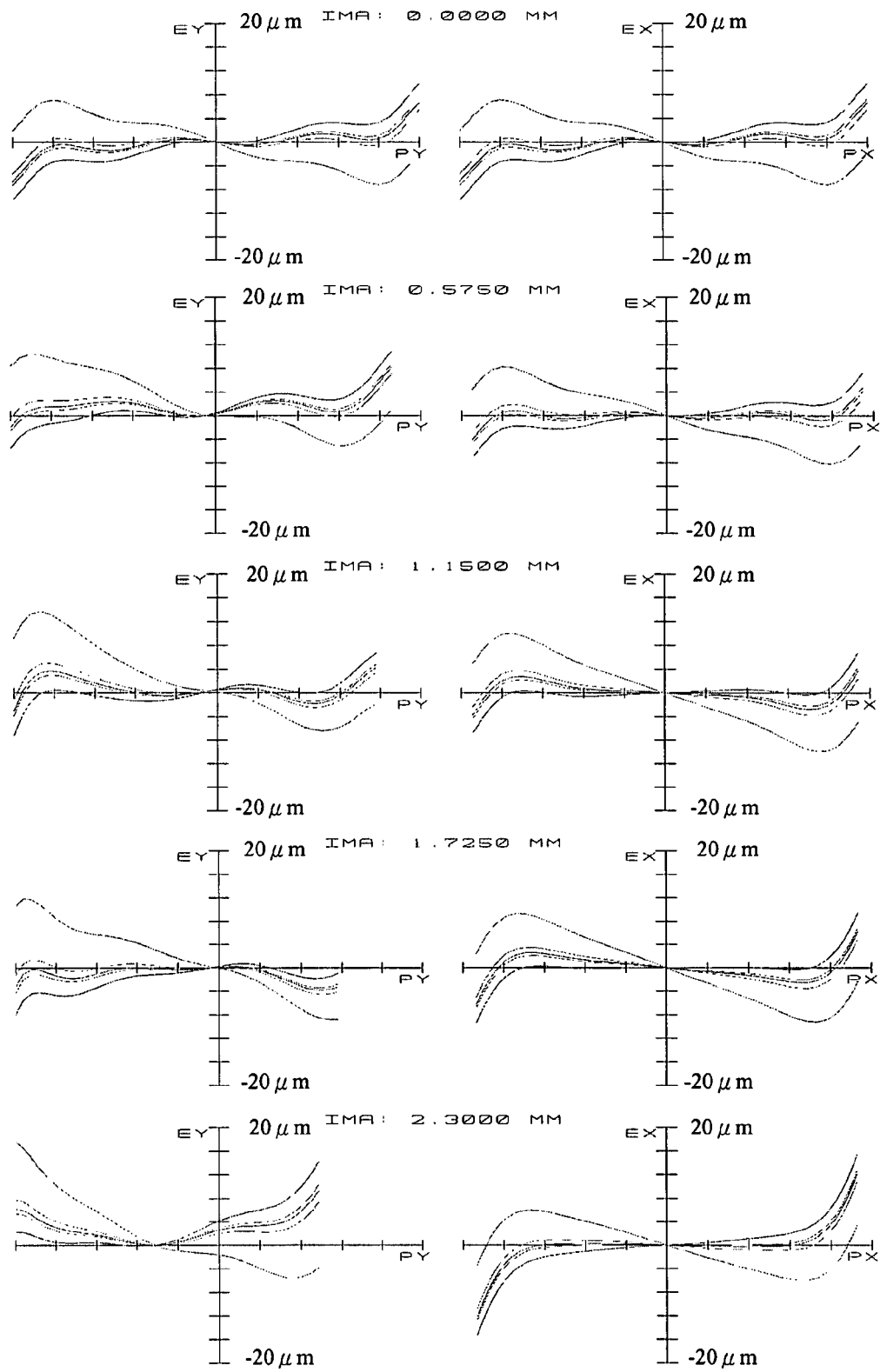
FIG. 17 is a transverse ray fan plot in different field (true image size 0, 0.575, 1.15, 1.725, 2.3 mm) of a further embodiment according to the present invention.
Figure 18:
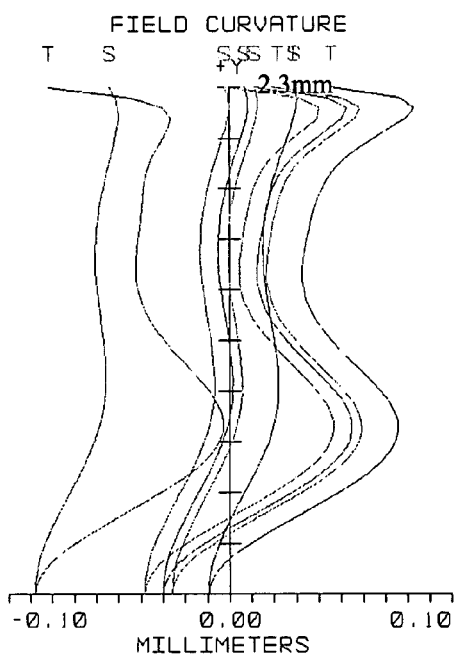
FIG. 18 shows field curvature of an image of a further embodiment according to the present invention.
Figure 19:
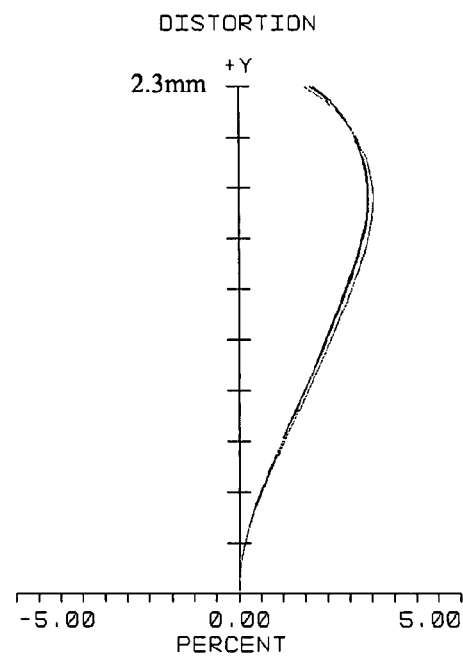
FIG. 19 shows distortion of an image of a further embodiment according to the present invention.
Figure 20:
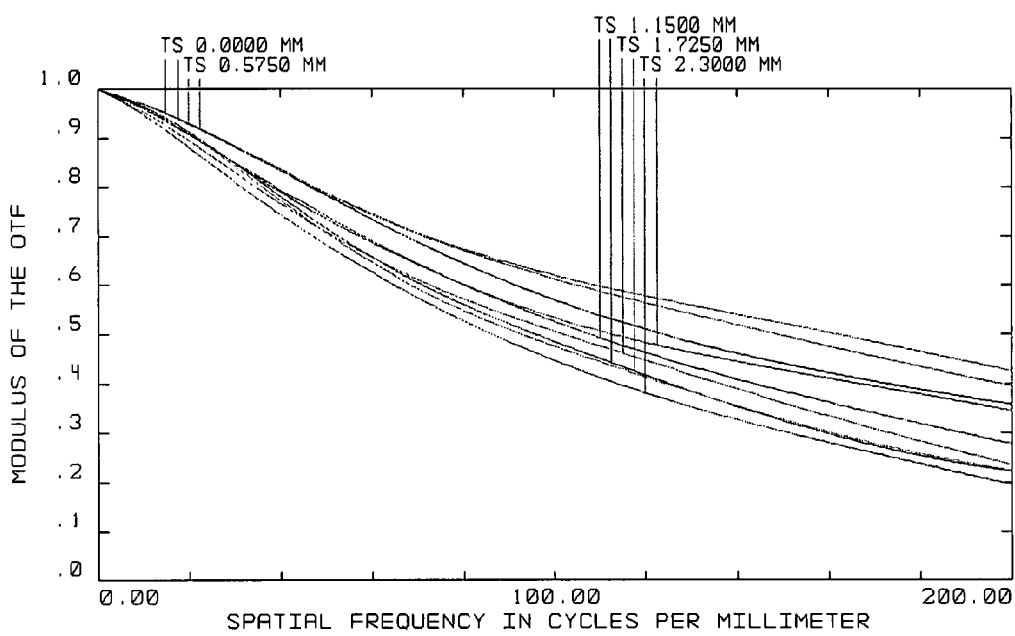
FIG. 20 shows modulation transfer function of a further embodiment, in five different field(true image size 0, 0.575, 1.15, 1.725, 2.3 mm) corresponding to spatial frequency ranging from 0 to 120 LP/mm.
Figure 21:
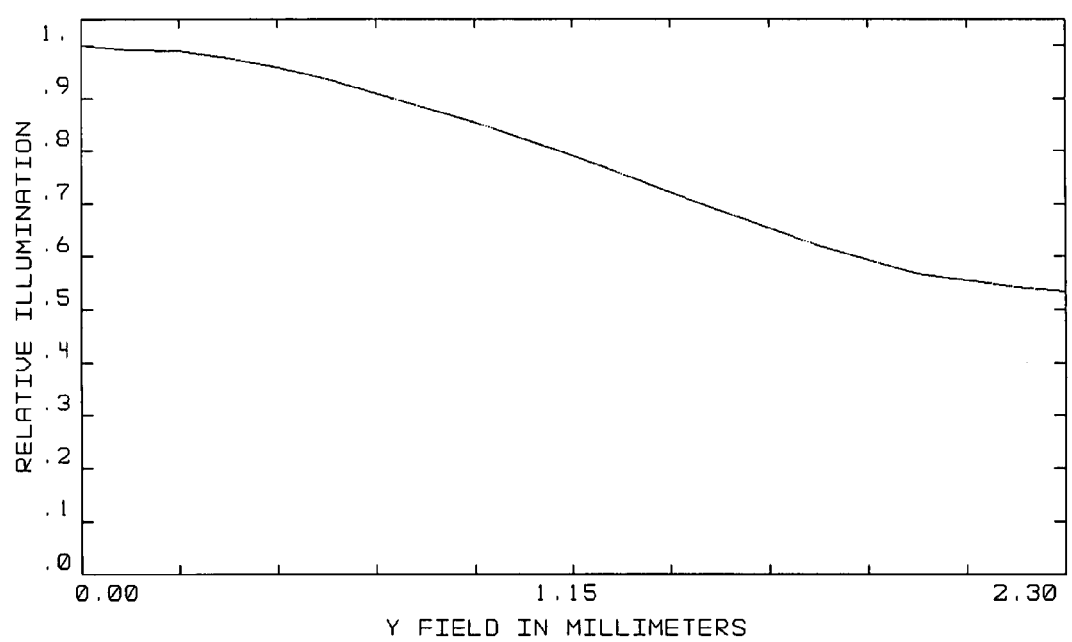
FIG. 21 is a graph showing relative illumination generating by full field toward zero field of a further embodiment according to the present invention.
Figure 22:
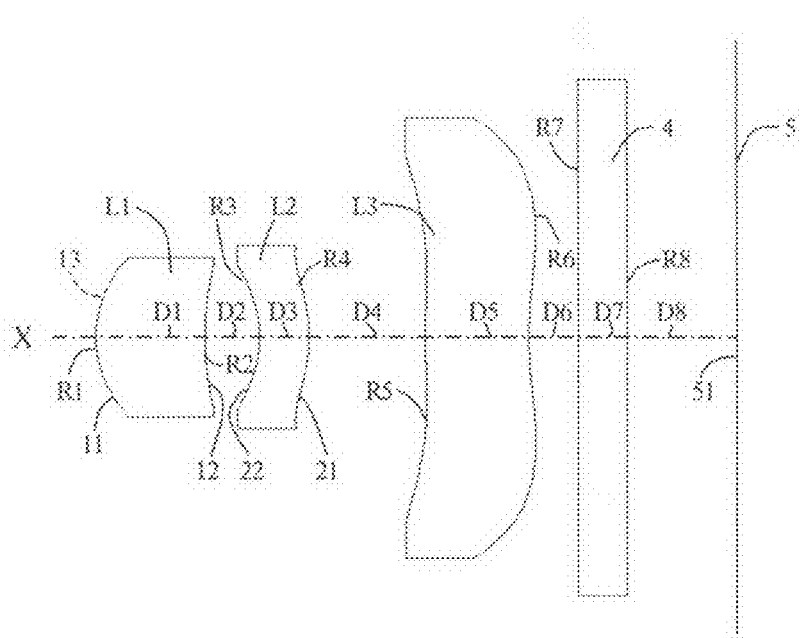
FIG. 22 is a schematic drawing of an optical structure of a further embodiment according to the present invention.
Figure 23:
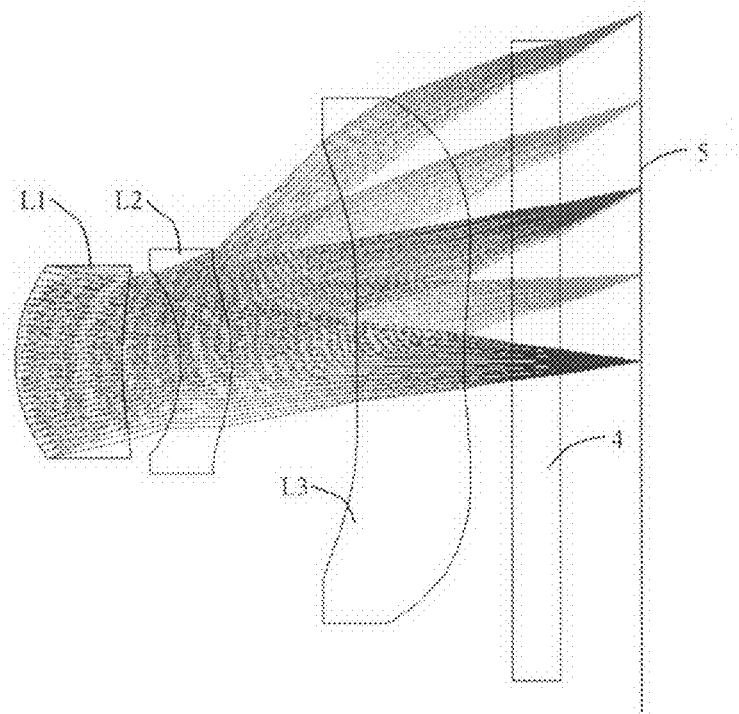
FIG. 23 is a schematic drawing of a light path of a further embodiment according to the present invention.
Figure 24:
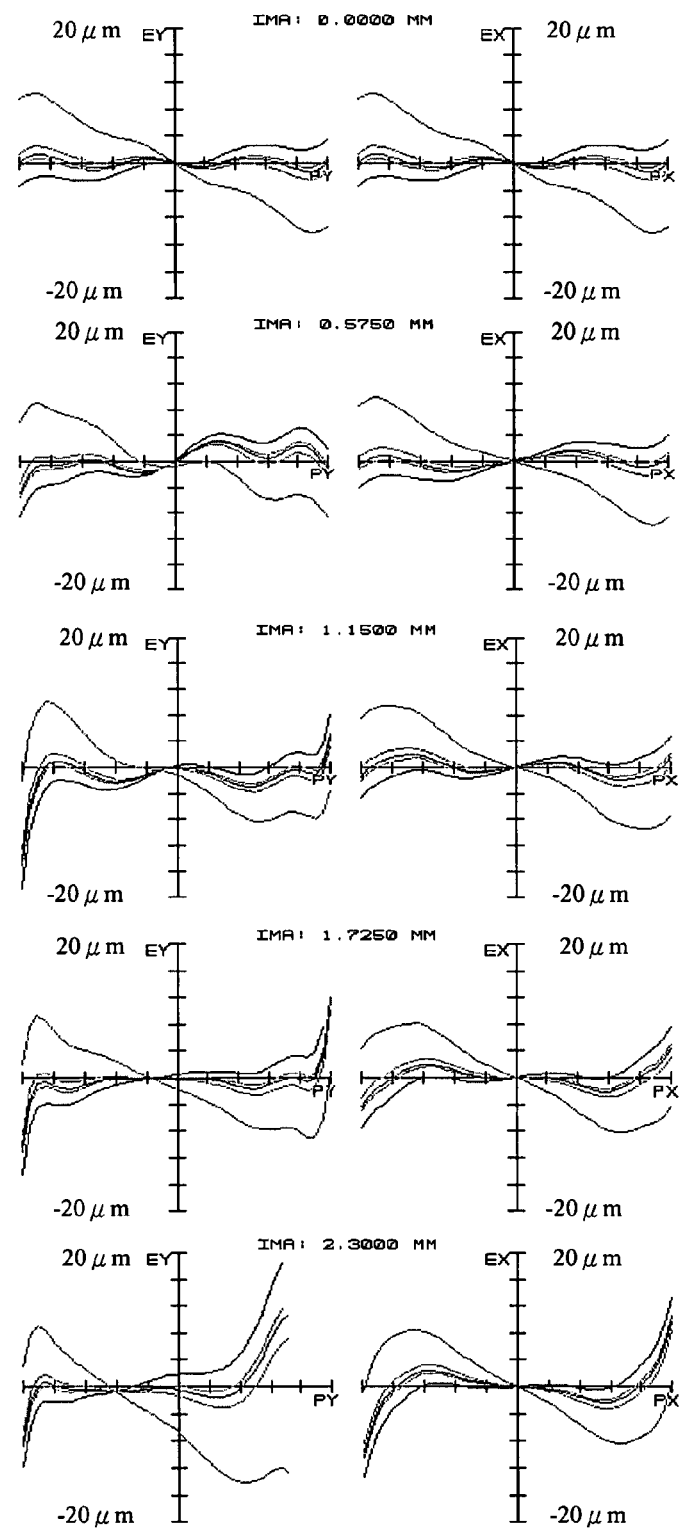
FIG. 24 is a transverse ray fan plot in different field (true image size 0, 0.575, 1.15, 1.725, 2.3 mm) of a further embodiment according to the present invention.
Figure 25:
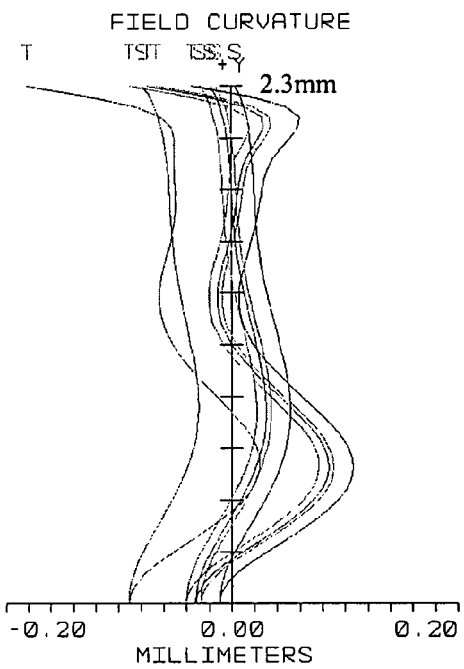
FIG. 25 shows field curvature of an image of a further embodiment according to the present invention.
Figure 26:
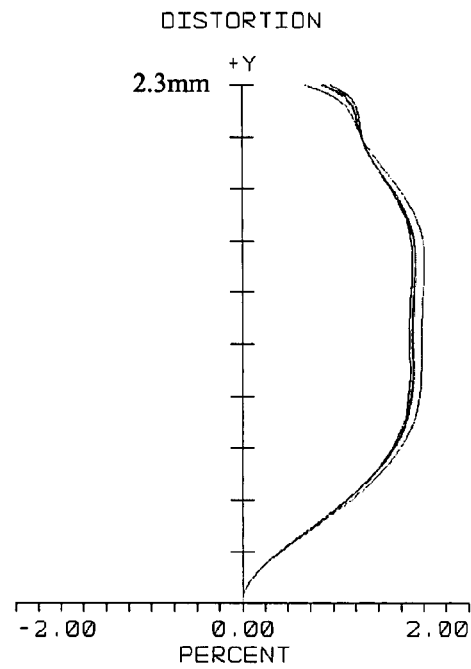
FIG. 26 shows distortion of an image of a further embodiment according to the present invention.
Figure 27:
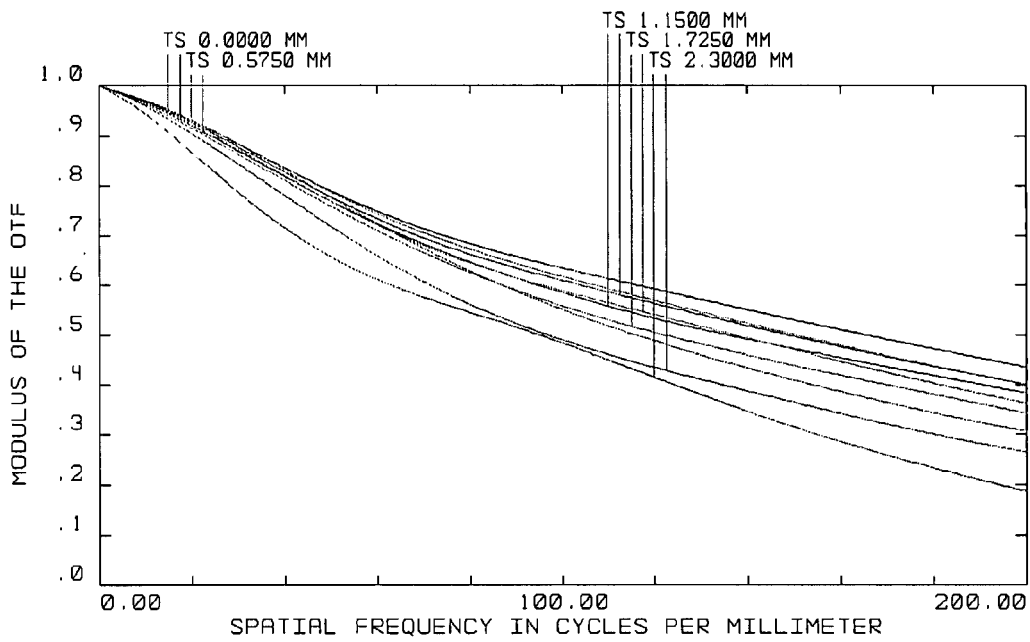
FIG. 27 shows modulation transfer function of a further embodiment in five different field(true image size 0, 0.575, 1.15, 1.725, 2.3 mm) corresponding to spatial frequency ranging from 0 to 120 LP/mm.
Figure 28:
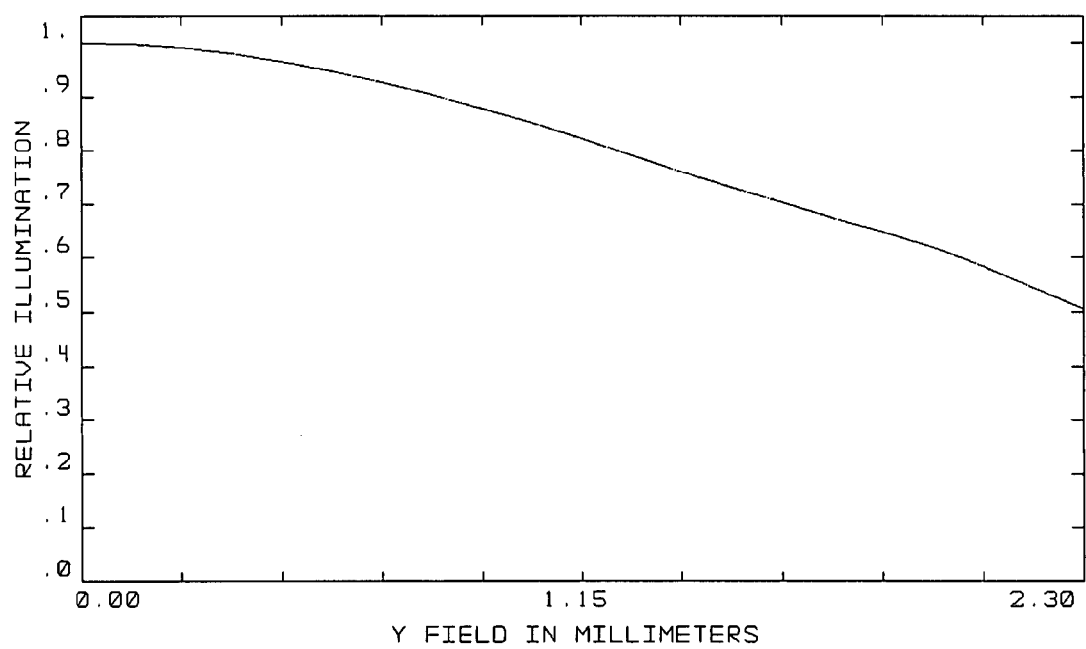
FIG. 28 is a graph showing relative illumination generating by full field toward zero field of a further embodiment according to the present invention.

Refer to FIG. 1, along an optical axis X in order from the object side, a three-piece type optical lens according to the present invention is composed of a first lens element L1 with positive refractive power that is a meniscus aspherical lens having a convex surface 11 on an object side and a concave surface 12 on an image side while at least one of the convex surface 11 and the concave surface 12 is an aspherical surface; a second lens element L2 with negative refractive power that is a meniscus aspherical lens having a convex surface 21 on an image side while at least one of the convex surface 21 and a concave surface 22 is an aspherical surface and the second lens element L2 is arranged between the first lens element L1 and a third lens element L3; the third lens element L3 with negative refractive power that is a M-shaped aspherical lens having a M-shaped object side and a M-shaped image side while a central surface of the optical axis thereof can be a convex surface or a concave surface; an IR cut-off filter 4 and an image sensor 5. While capturing image, light passes the first lens element L1, the second lens element L2, the third lens element L3 and the IR cut-off filter 4, then an image is formed on a sensing surface 51 of the image sensor 5, as shown in FIG. 2. Moreover, a pre-aperture is disposed on the optical lens according to the present invention while an aperture stop 13 is arranged on the convex surface 11 of the object side of the first lens element L1, as shown in FIG. 1 & FIG. 2, or on front of the convex surface 11 on the object side of the first lens element L1 (not shown in figure). A center-aperture may be disposed on the optical lens and an aperture stop thereof is disposed on the image side of the first lens element, the object side of the second lens element or between the e image side of the first lens element and the object side of the second lens element (not shown in figure).

The three piece type optical lens of the present invention satisfies following conditions:

$0.4f \leq d < 0.9f;$ $0.3 < |R1/R2| < 0.6;$ $2.8 \leq Fno < 3.6;$ $0.2 < br/f < 0.4;$ $0.5 < f1/f < 1;$ and $-10.0 < f3/f < -2.0;$ wherein f is an effective focal length of the whole optical lens according to the present invention;

d is the distance between the object side of the first lens element L1 and the image side of the third lens element L3;

R1 is a radius of curvature of the object side of the first lens element L1,

R2 is a radius of curvature of the image side of the first lens element L1,

Fno is a F number of the optical lens;

br is a back focal length of the whole optical lens of the present invention, f1 is an effective focal length of the first lens element L1, and f3 is an effective focal length of the third lens element L3.

The First Embodiment

Refer from FIG. 1 to FIG. 7 and the following list one: the list includes data of optical surface number (#) in order from the object side, type of each optical surface, the radius of curvature R (mm) of each optical surface on the optical axis, the on-axis surface spacing D (mm) of each optical surface and materials that the lens made of.

List One

| Surf # | Type | R | D | |
|--------|------|---|---|---|
| (OBJ) | STANDARD | ∞ | ∞ | |
| 1 (STO) | EVENASPH | 1.045866 | 0.6254172 | APL5014DP |
| 2 | EVENASPH | 2.856472 | 0.333 | |
| 3 | EVENASPH | −1.211588 | 0.3 | PC-AD5503 |
| 4 | EVENASPH | −1.567001 | 0.71 | |
| 5 | EVENASPH | 7.428193 | 0.635 | APL5014DP |
| 6 | EVENASPH | 3.652651 | 0.3 | |
| 7 | STANDARD | ∞ | 0.3 | BK7 |
| 8 | STANDARD | ∞ | 0.6895 | |
| (IMG) | STANDARD | ∞ | | |

List 2: Aspheric Coefficients of Each Optical Surface

| Conic K | Coeff on A | Coeff on B | Coeff on C | Coeff on D | Coeff on E | Coeff on F |
|---------|-----------|-----------|-----------|-----------|-----------|-----------|
| 0.2920592 | 0.087064049 | −0.53200801 | −2.0272798 | 3.1146592 | −0.20910606 | −2.7558402 |
| −10.3516 | −0.16571862 | 0.74653154 | −5.7031601 | 13.152124 | −3.1970224 | −37.065607 |
| 0 | −0.19424105 | 2.4541884 | −11.689832 | 31.523331 | −37.98107 | 0 |
| 0 | 0.25064416 | 0.3038517 | −0.51127647 | −1.7983047 | 1.1041925 | 0 |
| 0 | −0.1543527 | 0.072206238 | −0.017051835 | 0.00214664 | −5.6296258e−005 | 0 |
| 0 | −0.14069475 | 0.050215116 | −0.017573297 | 0.00333273 | −0.00032903218 | 0 |

Conic and Aspherical Surface Formula:

$$Z = ch^2 / \{1 + [1-(1+K)c^2h^2]^{1/2}\} + Ah^4 + Bh^6 + Ch^8 + Dh^{10} + Eh^{12} + Fh^{14}$$

wherein c is a curvature, h represents height of lens,

K is a conic constant,

A, B, C, D, E, F respectively are 4th, 6th, 8th, 10th, 12th, 14th order aspherical coefficient.

The first lens element L1, the second lens element L2, and the third lens element L3 of this embodiment are respectively made of APL5014DP type plastic, PC-AD5503 type plastic and APL5014DP type plastic while the IR cut-off filter 4 is made of BK7 optical glass with thickness of 0.3 mm.

When the effective focal length f of the optical lens according to the present invention is 3.568 mm and the distance d between the convex surface 11 on the object side of the lens element L1 and the surface on the image side of the third lens element L3 is 2.603 mm, a relational expression $0.4f \leq d < 0.9f$ is satisfied. According to the list one, it is learned that $|R1/R2|$ is 0.366 and this satisfy the condition of $0.3 < |R1/R2| < 0.6$ while the Fno is 2.88, the condition of $2.8 \leq Fno < 3.6$ is also satisfied. Moreover, the br/f is 0.36 so that the condition of $0.2 < br/f < 0.4$ is satisfied and the f1/f is 0.756, the condition of $0.5 < f1/f < 1$ is satisfied. The f3/f is −3.929 so that the condition of $-10.0 < f3/f < -2.0$ is satisfied. Refer to the list one, list two and FIG. 1 to FIG. 7, it is learned that the total length of the optical lens according to this embodiment is 3.89292 mm.

The Second Embodiment

Refer from FIG. 8 to FIG. 14 and the following list one: the list includes data of optical surface number (#) in order from the object side, type of each optical surface, the radius of curvature R (mm) of each optical surface on the optical axis, the on-axis surface spacing D (mm) of each optical surface and materials that the lens made of.

List One

| Surf # | Type | R | D | |
|--------|------|---|---|---|
| (OBJ) | STANDARD | ∞ | ∞ | |
| 1 (STO) | EVENASPH | 0.9521654 | 0.7 | APL5014DP |
| 2 | EVENASPH | 1.868359 | 0.46 | |
| 3 | EVENASPH | −0.8740775 | 0.33 | OKP4 |
| 4 | EVENASPH | −1.178223 | 0.48 | |

-continued

| Surf # | Type | R | D | |
|--------|------|---|---|---|
| 5 | EVENASPH | −11.23862 | 0.96 | APL5014DP |
| 6 | EVENASPH | 18.92478 | 0.47 | |
| | ASPHERIAL | | | |
| 7 | STANDARD | ∞ | 0.145 | BK7 |
| 8 | STANDARD | ∞ | 0.6852577 | |
| (IMG) | STANDARD | ∞ | | |

List 2: Aspheric Coefficients of Each Optical Surface

| Conic K | Coeff on A | Coeff on B | Coeff on C | Coeff on D | Coeff on E |
|---|---|---|---|---|---|
| 1.2388473 | 0.10756979 | −0.25703696 | 2.5485253 | −2.9346596 | 2.7326332 |
| 8.764503 | 0.068892289 | 0.96971112 | −6.1227955 | 17.56916 | −20.81957 |
| −0.3800384 | 0.17443527 | 1.1430828 | −1.3541767 | 4.1598877 | −12.997629 |
| −0.512312 | 0.2573969 | 0.40575552 | −0.65066411 | 0.21857035 | 0.044341757 |
| 0 | −0.047939702 | −0.011027204 | 0.001404473 | −9.55247e−005 | 0 |
| −8.75739e+016 | −0.035433299 | 0.0042659581 | 0.00037998373 | −0.000121579 | 0 |

Conic and Aspherical Surface Formula:

$$Z = ch^2/\{1+[1-(1+K)c^2h^2]^{1/2}\} + Ah^4 + Bh^6 + Ch^8 + Dh^{10} + Eh^{12}$$

wherein c is a curvature,
h represents height of lens,
K is a conic constant,
A, B, C, D, E respectively are 4th, 6th, 8th, 10th, 12th order aspherical coefficient.

The first lens element L1, the second lens element L2, and the third lens element L3 of this embodiment are respectively made of APL5014DP type plastic, OKP4 type plastic and APL5014DP type plastic while the IR cut-off filter 4 is made of BK7 optical glass with thickness of 0.145 mm.

When the effective focal length f of the optical lens is 4.45408 mm and the distance d between the convex surface 11 on the object side of the lens element L1 and the surface on the image side of the third lens element L3 is 2.93 mm, a relational expression 0.4≦d<0.9f is satisfied. According to the list one, it is learned that |R1/R2| is 0.51 and this satisfy the condition of 0.3<|R1/R2|<0.6 while the Fno is 3.5, the condition of 2.8≦Fno<3.6 is also satisfied. Moreover, the br/f is 0.295 so that the condition of 0.2<br/f<0.4 is satisfied and the f1/f is 0.634, the condition of 0.5<f1/f<1 is satisfied. The f3/f is −2.888 so that the condition of −10.0<f3/f<−2.0 is satisfied. Refer to the list one, list two and FIG. 8 to FIG. 14, it is learned that the total length of the optical lens according to this embodiment is 4.23026 mm.

The Third Embodiment

Refer from FIG. 15 to FIG. 21 and the following list one: the list includes data of optical surface number (#) in order from the object side, type of each optical surface, the radius of curvature R (mm) of each optical surface on the optical axis, the on-axis surface spacing D (mm) of each optical surface and materials that the lens made of.

List One:

| Surf # | Type | R | D | |
|---|---|---|---|---|
| (OBJ) | STANDARD | ∞ | ∞ | |
| 1 (STO) | EVENASPH | 1.114541 | 0.66 | L-BAL42 |
| 2 | EVENASPH | 2.935603 | 0.333 | |
| 3 | EVENASPH | −1.211588 | 0.3 | PC-AD5503 |
| 4 | EVENASPH | −1.567001 | 0.71 | |
| 5 | EVENASPH | 7.428193 | 0.635 | APL5014DP |
| 6 | EVENASPH | 3.652651 | 0.3 | |
| 7 | STANDARD | ∞ | 0.3 | BK7 |
| 8 | STANDARD | ∞ | 0.663 | |
| (IMG) | STANDARD | ∞ | | |

List 2: Aspheric Coefficients of Each Optical Surface

| Conic k | Coeff on A | Coeff on B | Coeff on C | Coeff on D | Coeff on E |
|---|---|---|---|---|---|
| 0 | −1.02671936 | −0.068884 | 0.24955338 | −0.23824146 | 0.011541093 |
| 0 | 0.039706576 | 1.62437299 | 2.8582053 | −5.1534801 | 0 |
| 0 | −0.19424105 | 2.4541884 | 11.689832 | 31.523331 | −37.98107 |
| 0 | 0.12064416 | 0.3038517 | 0.91127647 | −1.7983047 | 1.1041925 |
| 0 | 0.4543327 | 0.072206238 | −0.017051835 | 0.00214664 | −5.6296258e−005 |
| 0 | −0.14069475 | 0.150215116 | −0.017573297 | 0.00333273 | −0.00032903218 |

Conic and Aspherical Surface Formula:

$$Z = ch^2/\{1+[1-(1+K)c^2h^2]^{1/2}\} + Ah^4 + Bh^6 + Ch^8 + Dh^{10} + Eh^{12}$$

wherein c is a curvature,
h represents height of lens,
K is a conic constant,
A, B, C, D, E respectively are 4th, 6th, 8th, 10th, 12th order aspherical coefficient.

The first lens element L1, the second lens element L2, and the third lens element L3 of this embodiment are respectively made of L-BAL42 molded glass, PC-AD5503 type plastic and APL5014DP type plastic while the IR cut-off filter 4 is made of BK7 optical glass with thickness of 0.3 mm.

When the effective focal length f of the optical lens is 3.60562 mm and the distance d between the convex surface 11 on the object side of the lens element L1 and the surface on the image side of the third lens element L3 is 2.638 mm, a relational expression 0.4f≦d<0.9f is satisfied. According to the list one, it is learned that |R1/R2| is 0.38 and this satisfy the condition of 0.3<|R1/R2|<0.6 while the Fno is 2.88, the condition of 2.8≦Fno<3.6 is also satisfied. Moreover, the br/f is 0.349 so that the condition of 0.2<br/f<0.4 is satisfied and the f1/f is 0.755, the condition of 0.5<f1/f<1 is satisfied. The f3/f is −3.872 so that the condition of −10.0<f3/f<−2.0 is satisfied. Refer to the list one, list two and FIG. 15 to FIG. 21, it is learned that the total length of the optical lens according to this embodiment is 3.901 mm.

The Fourth Embodiment

Refer from FIG. 22 to FIG. 28 and the following list one: the list includes data of optical surface number (#) in order from the object side, type of each optical surface, the radius of curvature R (mm) of each optical surface on the optical axis, the on-axis surface spacing D (mm) of each optical surface and materials that the lens made of.

List One:

| Surf # | Type | R | D | |
|---|---|---|---|---|
| (OBJ) | STANDARD | ∞ | ∞ | |
| 1 (STO) | EVENASPH | 1.131739 | 0.659822 | L-BAL42 |
| 2 | EVENASPH | 2.980781 | 0.362801 | |
| 3 | EVENASPH | −1.147414 | 0.312704 | PC-AD5503 |
| 4 | EVENASPH | −1.402019 | 0.780297 | |
| 5 | EVENASPH | 9.344721 | 0.670206 | E48R |
| 6 | EVENASPH | 3.242521 | 0.295425 | |
| 7 | STANDARD | ∞ | 0.3 | BK7 |
| 8 | STANDARD | ∞ | 0.492000 | |
| (IMG) | STANDARD | ∞ | | |

List 2: Aspheric Coefficients of Each Optical Surface

| Conic K | Coeff on A | Coeff on B | Coeff on C | Coeff on D | Coeff on E | Coeff on F | Coeff on G |
|---|---|---|---|---|---|---|---|
| 0 | 0.014349 | 0.072306 | 1.604128 | 2.150179 | −3.165406 | 1.326687 | 0 |
| 0 | 0.025049 | −0.177248 | 0.659086 | −1.470068 | −2.261540 | −0.430519 | 0 |
| 0 | −0.325856 | 3.141126 | −17.244902 | 56.935162 | 01.980482 | 81.543450 | −46.417413 |
| 0 | 0.067450 | −0.270228 | 0.874534 | 1.292196 | 0.995264 | −0.873310 | 0.557583 |
| −1088.132364 | −0.155882 | 0.088906 | −0.029565 | 0.001290 | 0.001439 | 0.000733 | −0.000313 |
| −20.667084 | −0.116499 | 0.043999 | −0.016342 | 0.002851 | −0.000250 | −0.000051 | 0.000014 |

Conic and Aspherical Surface Formula $$Z = ch^2/\{1+[1-(1+K)c^2h^2]^{1/2}\} + Ah^4 + Bh^6 + Ch^8 + Dh^{10} + Eh^{12} + Fh^{14} + Gh^{16}$$

wherein c is a curvature, h represents height of lens

K is a conic constant,

A, B, C, D, E, F, G respectively are 4th, 6th, 8th, 10th, 12th, 14th, 16th order aspherical coefficient.

The first lens element L1, the second lens element L2, and the third lens element L3 of this embodiment are respectively made of L-BAL42 molded glass, PC-AD5503 type plastic and E48R type plastic while the IR cut-off filter 4 is made of BK7 optical glass with thickness of 0.3 mm When the effective focal length f of the optical lens is 3.56392 mm and the distance d between the convex surface 11 on the object side of the lens element L1 and the surface on the image side of the third lens element L3 is 2.78583 mm, a relational expression 0.4f≦d<0.9f is satisfied. According to the list one, it is learned that |R1/R2| is 0.379679 and this satisfy the condition of 0.3<|R1/R2|<0.6 while the Fno is 2.8, the condition of 2.8≦Fno<3.6 is also satisfied. Moreover, when br is 1.087425 and br/f is 0.305120, the condition of 0.2<br/f<0.4 is satisfied while when f1 is 2.745667 and the f1/f is 0.770405, the condition of 0.5<f1/f<1 is satisfied. When f3 is −9.739370 mm and f3/f is −2.732769 so that the condition of −10.0<f3/f<−2.0 is satisfied. Refer to the list one, list two and FIG. 22 to FIG. 28, it is learned that the total length of the optical lens according to this embodiment is 3.873 mm.

What is claimed is:

1. A three-piece type optical lens, along an optical axis in order from an object side, comprising:

a first lens element with positive refractive power that is a meniscus aspherical lens having a convex surface on an object side thereof;

a second lens element with negative refractive power that is a meniscus aspherical lens having a convex surface on an image side thereof;

a third lens element with negative refractive power that is a M-shaped aspherical lens having a M-shaped object side and a M-shaped image side while a central surface of the optical axis thereof is a convex surface or a concave surface;

an IR cut-off filter; and an image sensor;

wherein the optical lens satisfies following conditions:

$0.4f \leq d < 0.9f$ $0.3 < |R1/R2| < 0.6$ $2.8 \leq Fno < 3.6$ $0.2 < br/f < 0.4$ $0.5 < f1/f < 1$ $-10.0 < f3/f < -2.0$ wherein f is an effective focal length of the optical lens; d is distance between an object side of the first lens element and an image side of the third lens element; R1 is a radius of curvature of the object side of the first lens element, R2 is a radius of curvature of the image side of the first lens element, Fno is a F number of the optical lens, br is a back focal length of the whole optical lens of the present invention, f1 is an effective focal length of the first lens element, f3 is an effective focal length of the third lens element.

2. The three-piece type optical lens as claimed in claim 1, wherein at least one of the convex surface and a concave surface of the meniscus first lens element is an aspherical surface.

3. The three-piece type optical lens as claimed in claim 1, wherein at least one of the convex surface and a concave surface of the meniscus second lens element is an aspherical surface.

4. The three-piece type optical lens as claimed in claim 1, wherein at least one of the object side and the image side of the M-shaped third lens element is an aspherical surface.

5. The three-piece type optical lens as claimed in claim 1, wherein a pre-aperture is disposed on the optical lens.

6. The three-piece type optical lens as claimed in claim 5, wherein an aperture stop of the pre-aperture is disposed on the convex surface of the object side of the first lens element or on front of the convex surface of the object side of the first lens element.

7. The three-piece type optical lens as claimed in claim 1, wherein a center-aperture is disposed on the optical lens.

8. The three-piece type optical lens as claimed in claim 7, wherein an aperture stop of the center-aperture is disposed on the image side of the first lens element, the object side of the second lens element, or between the image side of the first lens element and the object side of the second lens element.

9. The three-piece type optical lens as claimed in claim 1, wherein the first lens element, the second lens element, and the third lens element are made of plastic material while the IR cut-off filter is made of glass with thickness of 0.3 mm.

10. The three-piece type optical lens as claimed in claim 1, wherein the first lens element, the second lens element, and the third lens element are made of plastic material while the IR cut-off filter is made of glass with thickness of 0.145 mm.

11. The three-piece type optical lens as claimed in claim 1, wherein the first lens element is made of molded glass, the second lens element, and the third lens element are made of plastic material while the IR cut-off filter is made of glass with thickness of 0.3 mm.

* * * * *